Oct. 26, 1965

R. C. CUNNINGHAM ETAL 3,213,833

UNITIZED VAPOR GENERATION SYSTEM

Filed Dec. 30, 1960

WITNESSES:
A. J. Santantonio
Bernard R. Gieguey

INVENTORS
Richard C. Cunningham &
Charles F. Currey.
BY
D. J. Smith
ATTORNEY

Oct. 26, 1965    R. C. CUNNINGHAM ETAL    3,213,833
UNITIZED VAPOR GENERATION SYSTEM
Filed Dec. 30, 1960    5 Sheets-Sheet 2

Oct. 26, 1965  R. C. CUNNINGHAM ETAL  3,213,833
UNITIZED VAPOR GENERATION SYSTEM
Filed Dec. 30, 1960  5 Sheets-Sheet 3

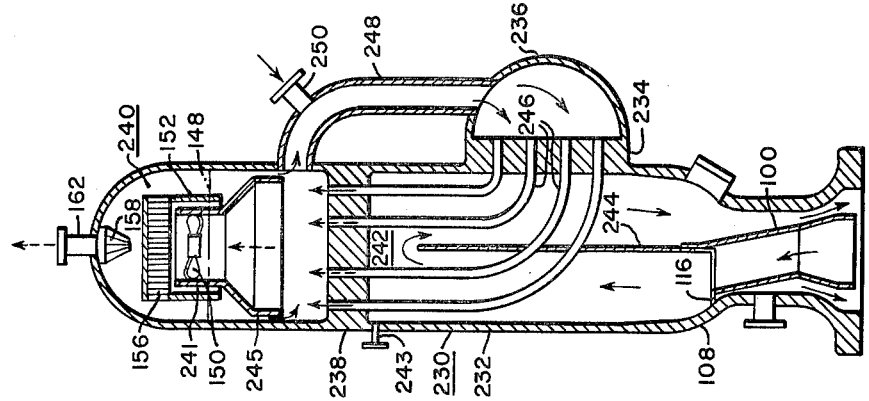
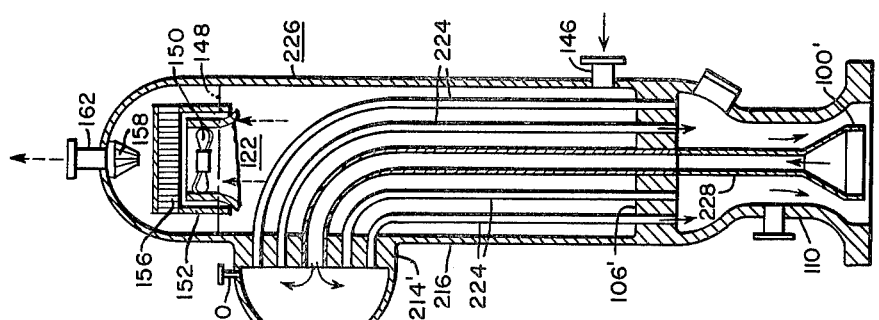
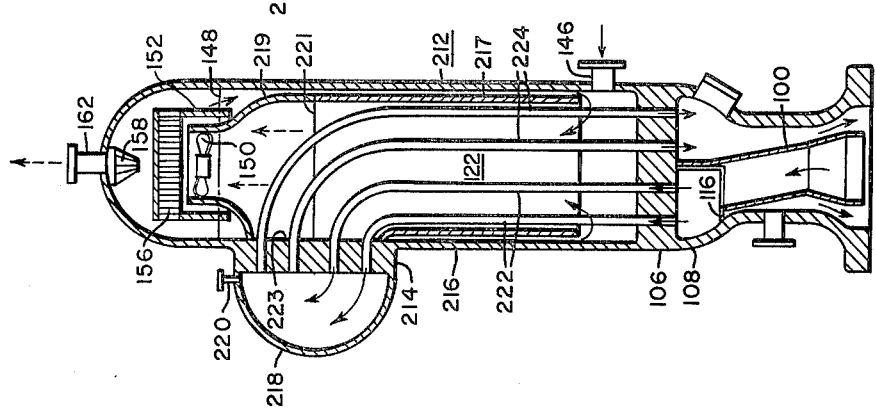

United States Patent Office 3,213,833
Patented Oct. 26, 1965

3,213,833
UNITIZED VAPOR GENERATION SYSTEM
Richard C. Cunningham and Charles F. Currey, Pittsburgh, Pa., assignors to Westinghouse Electric Corporation, East Pittsburgh, Pa., a corporation of Pennsylvania
Filed Dec. 30, 1960, Ser. No. 79,797
11 Claims. (Cl. 122—34)

The present invention relates generally to a novel, and efficient unitized vapor generating system and is more particularly directed to an arrangement of the vapor generating equipment within a single casing which also contains a neutronic reactor core.

Neutronic reactors are provided with a core region wherein a fissile isotope, such as U 235, U 233 or Pu 239, is disposed by providing a plurality of discrete fuel elements containing such isotopes. Moderator material is disposed adjacent the fuel elements to permit the "thermalizing" of neutrons emitted from the fissile material. A fluid is also provided to pass adjacent each of the fuel elements to remove heat therefrom. In certain types of reactors the moderator and cooling functions are performed by single fluid such as ordinary water under considerable system pressure. The nuclear reaction is controlled providing neutron absorber material such as hafnium, desirably in the form of elongated control elements or rods which are inserted and withdrawn from the core region.

The primary system of a conventional closed cycle forced circulation type of neutronic reactor comprises the reactor vessel, a vapor generator, and external piping and pumps, which are all separately located. In addition, the vapor separating equipment for the secondary system of a nuclear plant frequently is located externally to the vapor generator. As a result, this increases the complexity of the system, the weight of the vapor generating equipment, the space requirement for the separately located components, and the numbers of steps required for field assembly. The interconnecting piping also creates thermal stress problems. Hazards are also increased, because a break in the primary system piping is assumed as the maximum credible accident; therefore, the possibility of a reactor core meltdown must also be considered. A safety injection system is also usually provided to guard against the possibility of a core meltdown, which could result from the loss of water within the reactor caused by break in the primary system piping.

In view of the foregoing, it is an object of this invention to provide a novel and efficient vapor generating system and more specifically a novel and efficient nuclear reactor system.

Another object of this invention is to provide a vapor generating system including a neutronic reactor totally within a single pressure vessel and, thereby, to eliminate all external piping for the primary system of the reactor. The elimination of external conduits minimizes the field assembly problems by the elimination of interconnecting conduit and substantially all welding of the major conduits ordinarily required for the primary side of the vapor generating system. The elimination of the external conduits also eliminates the thermal stress problems arising with the use of conduits such as that usually employed for the primary system piping.

Another object of this invention is to utilize the principle of thermal circulation in a novel manner to provide the driving force for circulating the fluid within the primary side of the aforementioned pressure vessel; thereby eliminating circulating pumps in the primary system of a nuclear reactor, reducing the auxiliary power requirements particularly for the aforementioned circulating pumps, eliminating the possibility of accidental loss of primary coolant flow, and eliminating the possibility of inadvertently introducing cold primary coolant into a hot reactor core thereby producing not only thermal stresses but also a power transient with possible damage to the entire reactor core.

Still another object of this invention is to minimize the complexity, weight, space requirement, and economy of the vapor generating system of the character described by reducing the number of separate components required, by utilizing the same component for several functions, and by reducing the amount of material used in the fabrication of the components.

Another object of this invention is to minimize the pressure drop in the primary side of the vapor generating system.

Still another object of this invention is to reduce substantially the possibility of a reactor core meltdown, when a reactor is employed as a heat source in the vapor generating system, by minimizing the possibility of a rupture and the release of primary coolant on the primary side of the vapor generating system.

Another object of this invention is to eliminate the need for a safety coolant injection system for the prevention of a core meltdown to maintain a water level above the core in case of a major rupture of a primary conduit in a conventional reactor system.

Still another object of this invention is to provide a novel arrangement of the tubes within a vapor generator to make it possible to vent noncondensable gases from a high point of the primary side of the vapor generating system.

Other objects, features and advantages of the invention, and a more complete understanding of these can be had by referring to the following description of an illustrative embodiment of this invention, when taken in conjunction with the accompanying drawings, in which:

FIGURE 7 is a longitudinally sectional view of the upper portion of another form of vapor generating system of the invention and shows a two pass arrangement with a provision for venting noncondensable gases from the primary side of the vapor generating unit;

FIGURE 8 is a longitudinally sectional view of the upper portion of still another form of the vapor generating system and shows a two pass arrangement comprising a bundle of downcomer tubes with a single central riser pipe with a provision for venting non-condensable gases from the primary side of a vapor generating unit;

FIGURE 9 is a longitudinally sectional view of the upper portion of another form of vapor generating system of the invention and shows a baffled primary side for a vapor generating unit with a provision for venting non-condensable gases from the primary side;

The unitized vapor generating unit, described more fully hereinafter, is a novel combination within a single pressure vessel of a heat producing means and a heat exchanging means or vapor generator. In this embodiment of the invention, a pressure vessel is provided to contain all the necessary elements of the unitized vapor generating unit. The heat producing means, for example a neutronic reactor core, is disposed within the lower portion of the pressure vessel. The vapor generator, which comprises, in one application of the invention, a two pass U-shaped tube bundle and a plurality of vapor separating means, is disposed in the upper portion of the pressure vessel and serves as the heat exchanging means. In other arrangements of the invention, the vapor generator is modified as explained hereinafter. Inlet and outlet passages or conduits disposed within the pressure vessel couple the reactor core with the tube bundle of the vapor generator. A circulating primary fluid, which also serves as a moderator for the reactor core, is heated by heat developed within the reactor core. The primary fluid, upon thus being heated, begins to circulate due to well-known principles of thermal circulation. In furtherance of this purpose, the vapor generator, in one arrangement of the invention, is mounted directly above the reactor core, and the casing and associated components of the generator are supported by the reactor vessel associated with the reactor core.

The primary fluid, then, flows through the inlet conduit, through the tube bundle in the vapor generator, returns through the outlet conduit, is directed to the bottom of the reactor core by suitably disposed baffles, and then repeats the cycle by again flowing upwardly through the reactor core. A secondary fluid, contained within the vapor generator on the outside of the tube bundle, is heated by the primary fluid passing through the tube bundle. The secondary fluid then begins to boil, producing a vapor-liquid mixture, and flows upwardly. The vapor-liquid mixture from the secondary fluid then passes through a plurality of vapor separating means forming part of the vapor generator, and the vapor is separated from the liquid. The liquid is returned to the secondary fluid contained within the vapor generator, and the vapor discharges through a vapor outlet located at the top of the vapor generator. The vapor then is conducted to various, vapor utilizing means located externally of the pressure vessel.

Figure 1:
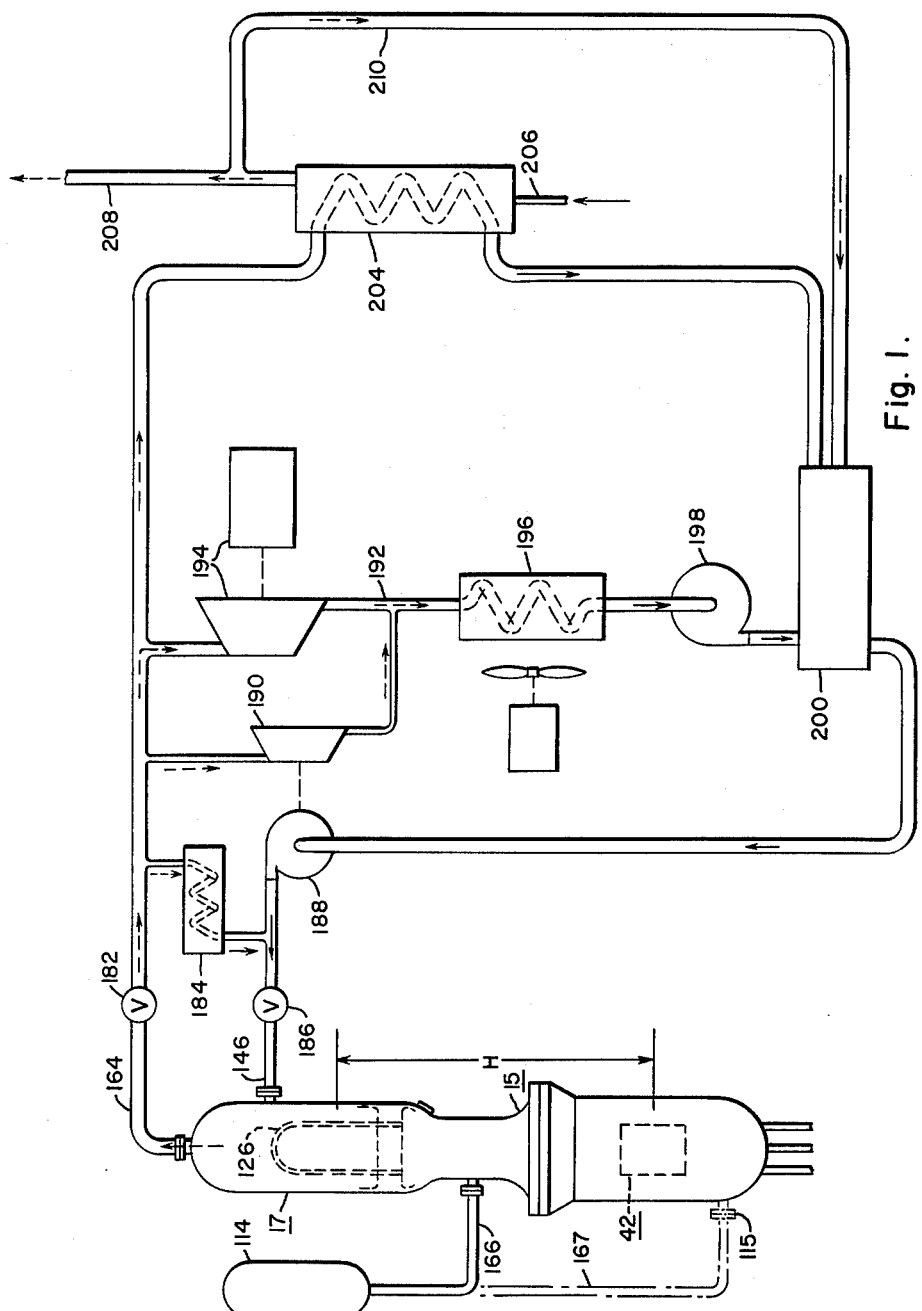
FIGURE 1 is a schematic fluid diagram of a unitized vapor generating system with certain auxiliary equipment and external vapor utilizing means.

Referring now more particularly to FIGS. 2A through 6 of the drawings, there is illustrated a unitized vapor generating unit, or more specifically a unitized steam generating unit 15 (FIG. 1). The unitized steam generating unit 15 comprises, in this embodiment, a thermal circulation reactor 16 forming a lower portion thereof and a steam generator 17 forming an upper portion thereof.

The pressure vessel portion of the thermal circulation reactor 16 is a reactor vessel 18 formed from a suitable material such as carbon steel, which can be provided with a stainless steel interior lining (not shown) for corrosion resistance, and which has, in this example, a wall thickness sufficient to withstand internal pressures on the order of 1500 p.s.i. The vessel 18 is generally cup-shaped having an elongated, open top portion which is adapted to be closed by the steam generator 17 to be described hereinafter. The lower end of the reactor vessel 18 has a plurality of control rod openings 20 formed therein to provide a passageway for a control rod shaft 22. At the junction of the reactor vessel 18 and the steam generator 17 there are provided outwardly extending flanges 24 and 26 respectively, having a plurality of threaded openings 28 and mating apertures 30 respectively, formed therein which are adapted to receive a plurality of head studs or mounting bolts 32 for securing the steam generator 17 to the reactor vessel 18.

The interior side wall of the reactor vessel 18 is provided with an inwardly extending annular flange or shoulder 34, which can be secured to the vessel 18 by any suitable means such as by welding. A tubular thermal shield 36 is shaped to be closely received within the vessel 18 but spaced from the interior side wall thereof. The thermal shield 36 is supported by the upwardly facing surface of the thermal shield support flange 34 and is maintained in spaced relation with the wall of the vessel 18 by means of a plurality of spacing pins 38, which are secured to the thermal shield 36 by any suitable means such as by machine screws (not shown). The thermal shield support flange 34 is preferably provided with axially extending openings (not shown) formed therein and communicating with the space 39 between the thermal shield 36 and the reactor vessel 18 to permit cooling of the thermal shield 36 and the adjacent portion of the reactor vessel 18. Alternatively the shoulder 34 can be replaced by a discontinuous series of circumferentially spaced brackets to communication with the space 39.

An inwardly facing shoulder 40 is formed on the inner side wall of the reactor vessel 18 adjacent the open end thereof and is adapted to receive a core supporting structure so that a reactor core 42 is suspended therefrom. In furtherance of this purpose, an annular core support barrel 44 is provided with an outwardly extending flange 46 on the upper edge thereof which is received and supported by the reactor vessel shoulder 40. The core support barrel 44 extends downwardly from its flange 46 and is juxtaposed, therefore, to substantially all of the thermal shield 36. A plurality of gusset plates 48 are secured to the under side of the core barrel flange 46 and the outer diameter of the core barrel 44 by any suitable means such as welding. The gusset plates 48 provide additional lateral support and act as stiffeners for the core barrel 44.

The lower end of the core barrel 44 is provided with a thickened portion 52 having threaded openings therein (not shown) to which a lower core support plate 54 of the reactor core 42 is secured. In furtherance of this purpose, the core support plate 54 is provided with an outwardly extending flange 56 at the outer periphery thereof. In the flange 56, there are provided openings (not shown) for securing the core support plate 54 to the core barrel 44 by any suitable means such as by screws (not shown) which pass through the openings in the flange 56 and are threaded into the threaded openings within the thickened portion 52 of the core barrel 44.

A plurality of additional openings 58 are provided in the outer periphery of the core support plate flange 56 to provide a passageway for hanger rods 60. A spider plate 62 is disposed within the lower portion of the reactor vessel 18. The spider plate 62 is of a rib-type construction having openings provided therein to permit the passage of control rods 64. The spider plate 62 also has a plurality of openings 63 on its periphery to permit the passage of hanger rods 60. The hanger rods 60 have threaded portions at each end. The threaded portions of the hanger rods 60 are passed through the core support plate flange openings 58 and also through the openings 63 in the outer periphery of the spider 62. The spider plate 62 is then supported by the hanger rods 60 by threading hanger rod nuts 66 on the extreme ends of the hanger rods 60. Control rod guide tubes 68 are disposed between the core support plate 54 and the spider plate 62 and secured to each of the aforementioned members by any suitable means such as welding. The guide tubes 68 are supported by the spider plate 62 and in turn at least aid in supporting and stiffening the lower core plate 54.

A flange 50 extending inwardly from the core barrel 44 is located approximately a third of the total height of the core barrel 44 from the top of the barrel 44 and is secured thereto by any suitable means such as by welding. A tubular supporting barrel 70 with an outwardly extending flange 72 formed at the top resets on the inner core barrel flange 50. A discoidal upper core plate 74 is secured by any suitable means such as welding to the bottom of the supporting barrel 70 to permit the removal of the upper core plate 74 and the supporting barrel 70 as a single unit. Substantially squarely shaped openings 76 and 78 are formed in the upper and lower core plates 74 and 54 in order to receive the control rods 64 and fuel assemblies 82. Rectangularly shaped openings 80 are also formed within both the aforementioned plates in order to receive similarly shaped fuel assemblies 83 disposed at the outer periphery of the core. The fuel assemblies 82 or 83 have reduced cross sections at both ends and thus form shoulders 84 or 85 at both ends. The reduced cross-sectional parts of the fuel assemblies 82 or 83 fit slidably into the fuel assembly openings 78 if substantially squarely shaped or into the fuel assembly openings 80 if rectangularly shaped. The fuel assemblies 82 or 83 are supported by shoulders 84 or 85 formed thereon and resting on the core support plate 54. Each of the fuel assemblies 82 or 83 comprises, in this arrangement, a plurality of plate-type fuel elements (not shown) containing highly enriched fissile material sandwiched in between stainless steel strips which are formed by any suitable means well-known in the art. Alternatively rod type fuel elements of well-known configuration can be substituted, as evident to those skilled in the art. Moreover, fissile material of low or intermediate enrichment can be employed by making obvious adjustments in uranium or plutonium inventory, as the case may be.

A clearance 86 is provided between the fuel assembly shoulder 84 and the core lateral support plate 74 to compensate for any differential thermal expansion which may occur between the fuel assembly 82 and the core barrel 44 as the reactor is brought to operating temperatures. An annular core baffle (not shown) can be disposed between the lower core support plate 54 and the upper core support plate 74 and has a central opening therein formed of the same configuration as the outer perimeter of the reactor core 42 in order to receive the fuel assemblies 82. Use of the aforesaid core baffle improves the coolant flow characteristics through the core 42.

In the present embodiment of this invention, the reactor core 42 is adapted to receive five control rods 64, which in this example are formed in a substantially square cross section and which are adapted to be closely received in the control rod channels. Each control rod 64 comprises an absorber section 88 and a fuel follower section 90. Since the control rod 64 is inserted and withdrawn relative to the core 42 by mechanisms 92 which are located beneath the bottom of the reactor vessel 18, the absorber section 88 forms the upper portion of the control rod 64 so that the absorber section 88 can drop into the reactor core 42 by gravity in the event of power failure or other contingency. The control rod drive mechanisms 92 can be selected from a number of well-known types, and therefore, need not be described further. The absorber section 22 has a hollow, squarely shaped cross section and is formed from a neutron absorbing material such a hafnium, europium, cadmium or boron. The hollow absorber section 88 permits fast neutrons to enter. The fast neutrons are then thermalized by the water flowing within the hollow absorber section 88, but the thermalized neutrons are then prevented from escaping by the absorber section 88 and therefore, the tendency of flux peaking is counteracted. The fuel follower section 90 is also squarely shaped and is secured to the lower end of the absorber section 88. The fuel follower section 90, however, has the same construction and contains the same materials as the substantially squarely-shaped fuel assembly 82.

A tubular shaped, lower circulating conduit 94, having an outwardly extending flange 96 secured by any suitable means such as by welding to the bottom of the lower circulating conduit 94, is supported by the core lateral support barrel flange 72. To the top of the lower circulating conduit 94 is secured a slide-fit adapter 98. The adapter 98 has a rounded inner surface and is cylindrically shaped to receive an upper circulating conduit 100. A slide-fit is thus maintained between the lower and upper circulating conduits 94 and 100 for assembly and disassembly purposes and for absorption of differential thermal expansion between the conduits 94 and 100 and their associated components during operation of the vapor generating system 15.

The lower circulating conduit 94 has a sufficient height to receive the entire absorber section 88 when the latter has been completely displaced from the reactor core 42. The lower circulating conduit flange 96 and the core lateral support barrel flange 72 rest on the inner core barrel flange 50 by gravity, or they can be secured, if desired, to the flange 50 by any suitable means such as by screws or studs (not shown).

The primary inlet of the steam generator 17, which forms the upper portion of the unitized steam generating unit 15, is coupled to the upper circulating conduit 100 by means presently to be described.

Figure 2A:
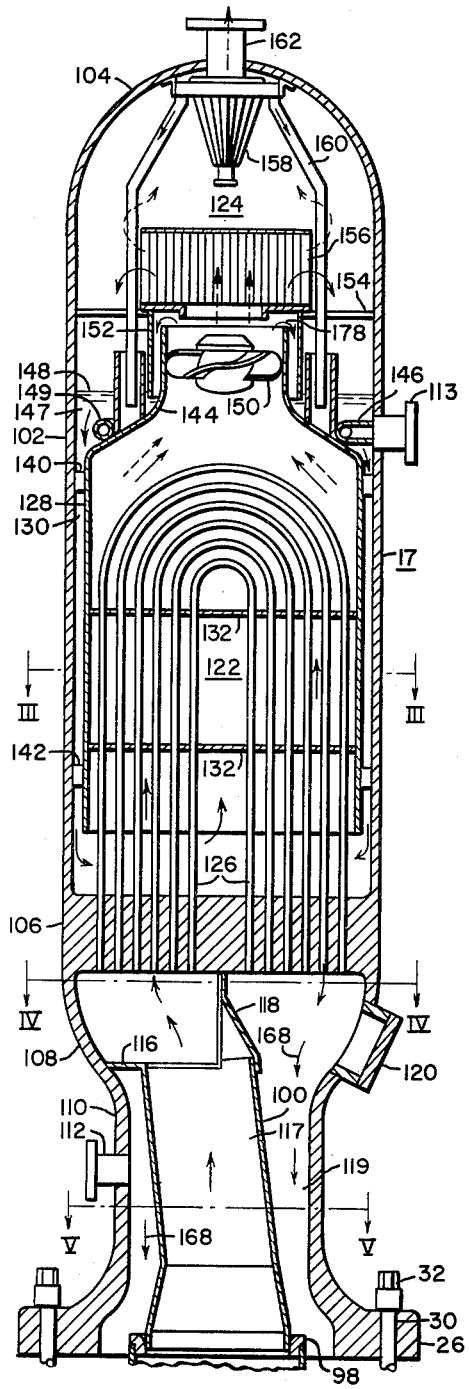
FIGURE 2A is a longitudinally sectional view of the upper portion of the vapor generating system shown in FIG. 1 and taken along reference line II—II of FIG. 4.

Referring in particular to FIG. 2A, there is illustrated an exemplary form of a vertical steam generator 17 which can be employed in this arrangement of the invention. The steam generator 17 is provided with an annular, pressurized casing 102 to which are secured a hemispherically shaped cap portion 104 at the top and a discoidal tube sheet 106 adjacent the bottom by any suitable means such as by welding. The larger diameter opening of a hemispherically shaped reducing portion 108 is then secured to the tube sheet 106, and the smaller diameter opening of the reducer 108 in turn is secured to a cylindrically shaped steam generator throat portion 110. The reducing portion 108 is used to conserve weight and space. The diameter of the steam generator throat 110, however, is made sufficiently large to minimize the pressure drop losses of the inlet and outlet fluid flows through the throat 110. To the bottom of the steam generator throat 110 is secured the steam generator mounting flange 26. The casing 102 and the upper cap 104 are formed from a suitable material such as carbon steel and has a wall thickness sufficient to withstand internal pressures on the order of 600 p.s.i. However, inasmuch as they communicate with the reactor vessel 18, the tube sheet 106, the reducer 108, the steam generator throat 110 and the steam generator flange 26 are formed from a suitable material such as carbon steel and are provided with stainless steel linings and have wall thicknesses sufficient to withstand internal pressures on the order of 1500 p.s.i.

A throat nozzle 112 is radially secured to the steam generator throat 110 in order to couple a pressurizer 114 (FIG. 1) of known design, with the space enclosed by the steam generator throat 110 and hence, the internal areas of the reactor vessel 18.

A box-type header 116 encloses approximately one-half of the space within the reducer 108. The header 116 is a two sided structure and encloses a space together with approximately half of the reducer 108 and half of the lower surface of the tube sheet 106 and distributes the primary fluid over the inlet side of the tube sheet 106. The aforesaid space communicates with the inlet ends or riser legs of the U-tubes 126 described below. The upper circulating conduit 100 couples the lower circulating conduit 94 and, in turn, the flow passages in the reactor core 42 to the header 116. The upper circulating conduit 100 is secured, in this example, to the bottom and one vertical side wall of the header 116 with a full diameter opening therein between the two aforementioned components.

A removable panel 118, shaped so as to produce a transition from the circular shape of the upper circulating conduit 100 to the planar configuration of the associated substantially vertical side of the header 116, is secured to the top of the upper circulating conduit 100 and to the upper portion of the vertical side of the header 116 by any suitable means such as with machine screws. The removable panel 118 is made sufficiently large to permit access to the U-tube ends and associated components within the header 116 for maintenance purposes. In this embodiment of the invention, the supporting barrel 70, the lower circulating conduit 94, the upper circulating conduit 100, and the header 116 form an inlet conduit or passage 117 to the primary inlet of the steam generator portion 17. An outlet conduit or passage 119 for the primary side of the steam generator 17 is defined by the adjacent volume of the reducer 108 and by the annular space 119 between the aforementioned inlet conduit 117 and the upper portion of the reactor vessel 18 and the steam generator throat 110. Openings (not shown) within the upper portion of the core barrel 44 couple the outlet conduit or passage 119 described hereinbefore with the space enclosed between the core barrel 44 and the reactor vessel 118 to form a passage 121 to the lower portion of the reactor vessel 18 from the outlet conduit or passage 119 for the primary side of the steam generator 17.

Since the outlet passage 119 serves as the primary pressure boundary and the differential pressure across the inlet conduit 117 is small, the inlet conduit 117 can be constructed of comparatively light gauge material of any suitable material such as stainless steel. By using inlet and outlet conduits or passages 117 and 119 respectively within the unitized steam generating unit 15, the need for heavy walled piping external to the steam generating unit 15 for the primary side of the system is eliminated, save, in certain applications, for the pressurizer conduit 166 (FIG. 1), described below. The inlet conduit 117 can also be formed to have a double wall containing a space to reduce the amount of heat transfer between the heated primary fluid flowing within the inlet conduit 117 and cooled primary fluid flowing within the outlet passage 119.

A manhole 120 is provided in the reducer 108 at a location directly opposite to the removable panel 118. The manhole 120 provides accessibility to the removal panel 118 and to the space enclosed within both the reducer 108 and the steam generator throat 110.

Returning now to the steam producing portion of the steam generator 17, the lower portion of the casing 102 encloses a steam generating chamber 122; and the upper portion of the casing 102, in combination with the cap portion 104, defines a separating area 124. A plurality of U-tubes 126, having their end portions secured to the tube sheet 106, are disposed within the steam generating chamber 122. A wall structure or wrapper 128 of a tubular shape is disposed within the annular casing 102 in a manner to enclose a substantial portion of the U-tubes 126. The wrapper 128 is concentric with, but spaced from, the casing 102 so as to define in conjunction therewith a downcomer or annular conduit 130 extending from the top to the bottom of the wrapper 128.

Figure 3:
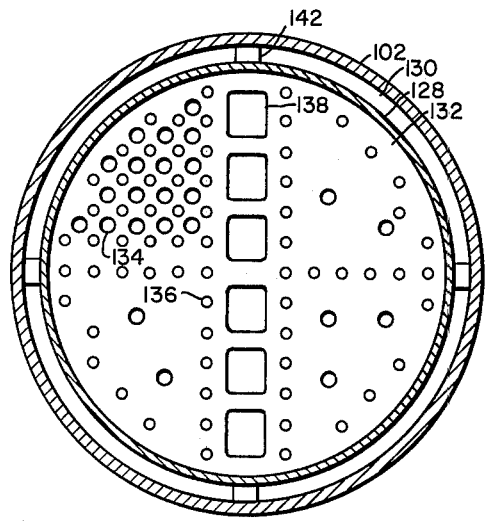
FIGURE 3 is a cross-sectional view of the vapor generating system taken along the line III—III of FIG. 2A.
Figure 4:
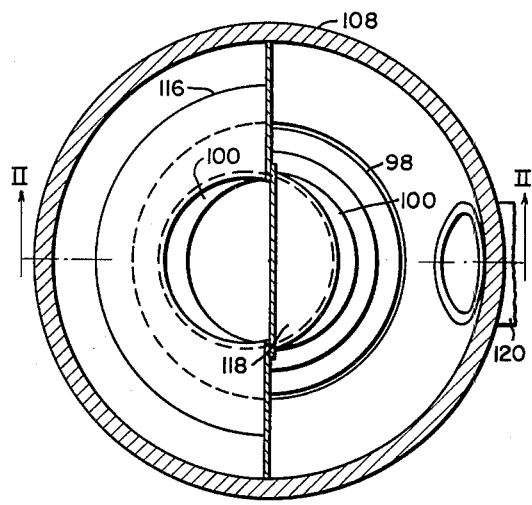
FIGURE 4 is a cross-sectional view of the vapor generating system taken along the line IV—IV of FIG. 2A.

The U-tubes 126 are maintained in spaced relation by a plurality of plates or spacers 132, which are held in position by a plurality of vertically extending tie rods (not shown) and collars (not shown). The tie rods have one end threaded to the tube sheet 106, and the other end threaded to receive a nut for securing the uppermost spacer. As illustrated by FIG. 3, each of the spacers 132 is provided with a plurality of circular holes 134 through which the U-tubes 126 extend. Additional circular holes 136 are provided, which are smaller in diameter than the first-mentioned holes and interspersed among them for the passage of the generated vapor. Additionally, a plurality of relatively large, rectangular openings 138 are provided in the spacers 132 for the passage of vapor. The rectangular openings 138 are located in the space between the legs of the U-tubes 126.

A plurality of upper brackets 140 and lower brackets 142, which are spaced circumferentially, are provided to space the wrapper 128 from the annular casing 102. The lower brackets 142 are welded only to the casing 102 and not to the wrapper 128. The upper brackets 140 are welded to both the wrapper 128 and the casing 102 thereby suspending the wrapper 128 from the casing 102. The wrapper 128 is constructed with an upward extension 144 above the U-tubes 126. The wrapper extension 144 has a diameter smaller than that of the wrapper 128 which encompasses the U-tubes 126. The extension 144 constitutes a conduit or riser for conducting the steam and water mixture from the steam generating chamber 122 to the separating area 124.

A feed-water inlet conduit 146, for supplying a suitable quantity of feed-water to the steam generating chamber 122, is disposed below operating water level 148, which is maintained above the U-tubes and above the wrapper 128. An annular water storage chamber 147 is formed between the casing 102 and the wrapper extension 144. The feed-water conduit 146 projects into the water storage chamber 157 and is coupled with an annular header 149 which extends substantially concentrically throughout the chamber 147. The annular header 149 within the chamber 147 is provided with a plurality of holes (not shown) along its lower side so that an even distribution of feed-water results.

For a more particular description of the steam generating portion of the steam generator 17, reference is made to the detailed description set forth in the abandoned patent application of John P. Rathbun and Millard A. Nelson, Serial No. 651,889, filed April 10, 1957, entitled, "Heat Exchanger Apparatus;" and assigned to the assignee of the present application.

The upper portion of the wrapper extension 144, as viewed in FIG. 2A, is provided with a series of stationary, deflecting vanes 150, which impart a swirling action to the steam and water mixture flowing therepast and causes the water to be thrown radially outwardly by centrifugal action. A baffle 152, which encompasses the extension 144 and is concentric therewith, is disposed between the extension 144 and the casing 102. The baffle 152 is secured at its upper end to a support 154, and its lower end extends below the water level 148. The centrifuged water impinges on the baffle 152 and flows downwardly in the annular space defined by the wrapper extension 144 and the baffle 152 and joins the water stored in the water storage chamber 147. The remaining portion of the mixture continues to flow upwardly and passes through a chevron separator 156 comprising a plurality of vanes imparting a further separating action to the mixture. The chevron separator 156 is centrally positioned within the casing 102 by supports 154 which extend radially inwardly and also secure the baffle 152. These supports 154 are rod-like members providing spaces therebetween for the downward flow of the water separated in the chevron separator 156. The water flows downwardly in an annular space defined by the baffle 152 and the casing 102 and joins the water stored in the water storage chamber 147. The remaining portion of the mixture flows upwardly into a purifier 158 supported from the cap portion 104. The purifier 158 is provided with drain pipes 160, which return the water removed in the purifier 158 to the water stored in the water storage chamber 147. The steam flows from the purifier 158 via a steam outlet 162 and a steam conduit 164 (FIG. 1) to external steam utilizing means.

For a more particular description of the separating area 124 contained within the upper portion of the steam generator 17, reference is made to the detailed description of the abandoned patent application of Roland L. Coit, Serial No. 651,888, filed April 10, 1957, entitled, "Heat Exchanger Apparatus," and assigned to the assignee of the present application.

The requirement for steam separation is a function of the steam quality in the steam and water mixture and the velocity of the steam immediately above the steam to water interface. There are sizes and ratings of steam generators suitable for use in the unitized design in which no auxiliary separating equipment is needed. The use of free surface separation in such units simplifies the steam generator.

The components comprising this invention are also so arranged as to permit the removal of the entire reactor core 42, the removal and replacement of the individual fuel assemblies 82, or the relocation of the fuel assemblies 82 by a procedure now to be described. The first step is to disassemble the flanged joint joining pressurizer conduit 166 (FIG. 1) to the throat nozzle 112. The next step is to disassemble the flanged joint between the steam outlet 162 and the steam conduit 164 (FIG. 1). The flanged joint 113 in the feed-water conduit 146 adjacent the casing 102 is then disassembled. The steam conduit 164, the pressurizer conduit 166, and the feed-water conduit 146 are then moved to one side, so as to permit the removal of the steam generator 17. Instrumentation connections, such as for the level controller (not shown) for the water level 148, are also removed. The head studs 32 are then removed. Then the steam generator 17 containing the header 116 and the upper circulating conduit 100, both being supported within the lower portion of the steam generator 17, is removed.

The removal of the steam generator 17 can be simplified by coupling the pressurizer 114 to a reactor vessel nozzle 115 (FIG. 1) as indicated by dashed lines 167 and thereby eliminating the throat nozzle 112. This would permit the pressurizer conduit 167 (FIG. 1) to remain coupled to the reactor vessel 18 and reduce the amount of disassembly work required to remove the steam generator 17 from the reactor vessel 18. The studs (not shown) if used to secure the lower circulating conduit flange 96 and the upper core plate support barrel flange 72 to the inner core barrel flange 50 are then removed. The lower circulating conduit 94 is then removed from the reactor vessel 18 and is followed by the removal of the upper core plate supporting barrel 70 and the upper core supporting plate 74 which is attached to the supporting barrel 70. The top of the reactor core 42 is now exposed so as to permit the removal and replacement of the individual fuel assemblies 82 or 83 or the relocation cycling of these fuel assemblies.

To remove the entire reactor core 42 the control rod shafts 22 are disconnected from the control rod 64 by any suitable means such as the use of a remote control manipulator. The control rods 64 are also maintained in the down position with the absorber section 88 disposed within the reactor core 42 by any suitable means such as flanges secured to the top of the absorber section 88 and supported by the upper core plate 74. The core barrel 44, the reactor core 42, the control rods 64, the core support plate 54, the hanger rods 60, and the spider 62 are all removable as a unit.

Figure 2B:
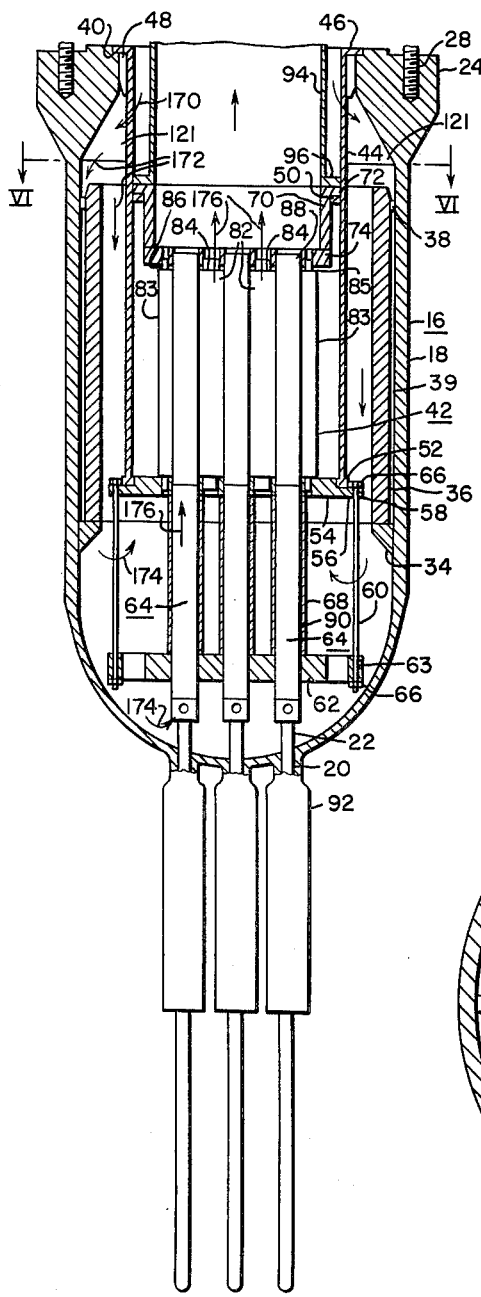
FIG. 2B is a longitudinally sectional view of the lower portion of the vapor generating system shown in FIG. 1 and taken along the line II—II of FIG. 4.
Figure 5:
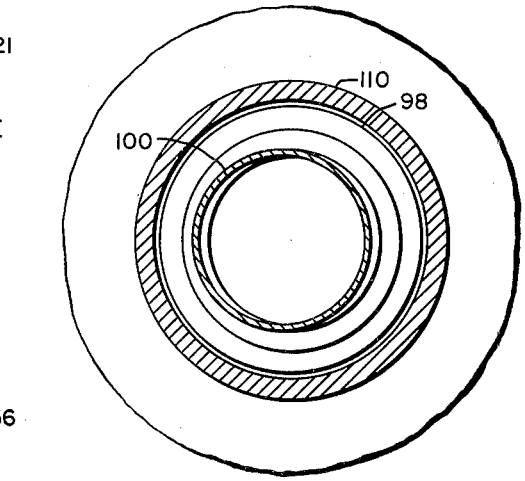
FIGURE 5 is a cross-sectional view of the vapor generating system taken along the line V—V of FIG. 2A.
Figure 6:
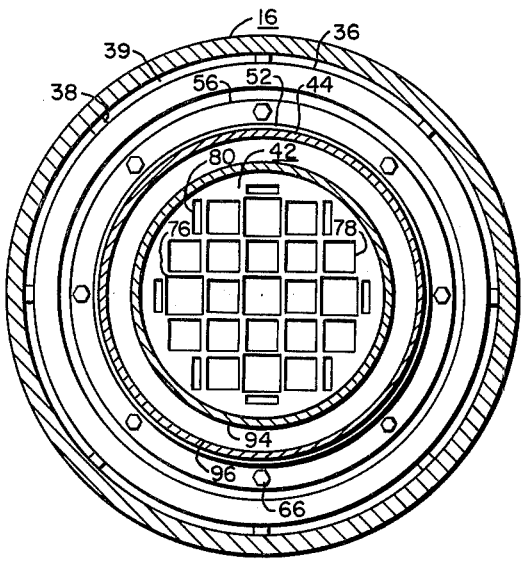
FIGURE 6 is a cross-sectional view of the vapor generating system taken along the line VI—VI of FIG. 2B.

The overall flow circuitry is shown in FIG. 1, and the flow circuitry within the unitized steam generating unit 15 is shown in FIGS. 2A and 2B. The steam flow has been indicated by the dotted line arrows, and the water flow has been indicated by the full line arrows. In operation, the heat developed by the chain reaction within the reactor core 42 is removed by a suitable coolant or primary fluid circulating through the aforementioned core 42. The coolant, which in this case, is ordinary water, also serves as the moderator material provided for the chain reaction being sustained within the reactor core 42. The primary water, upon absorbing heat from the reactor core 42, circulates through the reactor core 42 and upwardly through the primary system by the utilization of the thermal circulation principle. The heated primary water flows from the reactor core 42, through the upper core plate supporting barrel 70, through the lower and upper circulating conduits or baffles 94 and 100 respectively, and into the header 116.

The heated primary water then flows from the header 116 through the U-tubes 126, where it gives up its heat to the secondary water disposed on the outside of the U-tubes 126. The cooled primary water then flows from the U-tubes 126 and flows downwardly through reducer 108 and the steam generator throat 110 within the annular outlet passageway 119 formed between the upper circulating conduit 100 and the shell of the steam generator throat 110, as indicated by flow arrows 168. The primary water continues its downward flow by passing through openings (not shown) in the upper portion of the core barrel 44 as indicated by flow arrow 170 and thence through the annular passageway 121 between the core supporting barrel 44 and the reactor vessel 18. The primary water then flows downwardly on either side of the thermal shield 36, as indicated by flow arrows 172.

At the lower end of the thermal shield 36 the primary water flows through axial openings (not shown) in the annular flange 34 and flows into the lower hemispherical end portion of the reactor vessel 18, where the primary water reverses its direction of flow as indicated by flow arrows 174. The primary water then flows upwardly through the fuel assemblies 82 and 83 and through the control rods 64 as indicated by flow arrows 176. This completes the flow cycle of the primary water.

The primary water passing through the U-tubes 126 is of sufficient temperature to vaporize a portion of the second water disposed on the outside of the U-tubes 126. The vaporized portion of the secondary water comprises, in this embodiment, steam with the entrapped water. The steam-water mixture passes from the steam generating chamber 122, through the wrapper extension 144, and through the vanes 150. Thence the separating action continues until the steam flows out of the separating section, via conduits 162 and 164 as described previously.

The basic principle of thermal circulation, which is utilized in this invention, can be explained by referring to FIG. 1. FIG. 1 shows a heat source, which in this example is the reactor core 42 where the primary water is heated, and a heat sink, which in this example is provided by the steam generator 17. The heat sink is located at a height H feet above the heat source, which constitutes the thermal head. The primary water, heated by the reactor core 42, rises up the hot leg, which in this example comprises the upper core plate supporting barrel 70 and the lower and upper circulating conduits 94 and 100 respectively, to the steam generator 17, where the primary water gives up its heat to the secondary water to produce steam. The primary water then returns to the reactor core 42 via the cold leg, which in this example is defined as the passageway between the circulating conduits 94 and 100 and the shell of the unitized steam generating unit 15.

The driving force or head afforded by the phenomenon of thermal circulation must be equal to the total pressure drop in the primary circuit and can be calculated from the following well-known formula:

$$T.H. = \Delta P = (H)(\rho\ cold - \rho\ hot)$$

where

T.H.=Thermal or driving head.
H=Height of heat sink above heat source.
$\rho$ cold=Density of primary water in the cold leg.
$\rho$ hot=Density of primary water in the hot leg.
$\Delta P$=Pressure drop caused by flow of primary water in the primary system.

Reference is now made to FIG. 1, which shows how the reactor heat is utilized. The unitized steam generating unit 15 has been hereinbefore described. The pressurizer 114 is electrically heated by immersion elements (not shown) to control the pressure in the primary system within a range to assure that the temperature of the primary water leaving the reactor core 42 is 10 degrees below the boiling point in this example.

The steam, after leaving the top of the unitized steam generating unit 15, flows through a main steam outlet valve 182 and then continues to flow through the main steam conduit 164. The steam can then be directed so as to pass through a thermal circulation heat exchanger 184, which is sized for decay heat removal and permits the shutdown of the plant with no requirement for auxiliary power to circulate water on either the primary or secondary side of the steam generating system 15. The steam condenses in the thermal circulation heat exchanger 184 and flows as water into an external feed-water conduit 146, flows through a feed-water inlet valve 186, and returns to the steam generator 17.

During normal operations a feed-water pump 188 is driven by an auxiliary steam turbine 190 which receives its steam from the main steam conduit 164 and minimizes the auxiliary electrical power requirements. The steam, after passing through the auxiliary turbine 190, then enters a main turbine exhaust conduit 192.

The major portion of the steam flows from the main steam conduit 164 to a turbine generator 194, where the primary function of the plant is accomplished in the generation of A.C. power. After the steam passes through the turbine side of the turbine generator, the steam flows through the main turbine exhaust conduit 192 and into a fan-cooled condenser 196, where the waste heat is rejected to the atmosphere and the steam is condensed. The water from the fan-cooled condenser 196 then flows to a condensate pump 198, which pumps the water into a deaerator 200, where the noncondensable gases entrapped within the water are removed. The water then flows from the deaerator 200 by gravity to the feed-water pump 188, which pumps the water back to the steam generator 17 and thus completes the cycle for the secondary system.

A portion of the steam is also passed from the main steam conduit 164 through a reboiler 204, which produces low pressure steam for space heating and make-up purposes. The low pressure steam in the reboiler 204 is produced from space heating return water or by raw water make-up entering the shell side of the reboiler 204 through a reboiler inlet conduit 206, absorbing heat from the steam passing through the tube side of the reboiler 204, vaporizing into steam, and then flowing from the reboiler 204 via a reboiler outlet conduit 208 to external space heating units. A portion of the low pressure steam from the reboiler 204 also passes through a steam plant make-up conduit 210 to the deaerator 200 as a make-up supply for the secondary side of the steam plant. The steam passing through the tube side of the reboiler 204 is condensed into water, and the water then flows to the deaerator 200.

In any plant installation, a major problem is one of starting from a cold or shutdown condition. One of the important features of the thermal circulation concept as applied herein, is the freedom from very sizable auxiliary power requirements associated with primary water circulation pumps. To take advantage of this situation, the start-up procedure envisions starting with the primary side of the plant full of water at room temperature and with the water in the secondary side of the plant at its normal operating level. The primary side of the plant can be pressurized to a value in the range of 200 to 500 p.s.i. using a charging pump (not shown). The warm-up heat will be developed by criticalizing the reactor core 42.

After the reactor core 42 has gone critical, but with very little heat input to the primary water, sufficient thermal circulation is developed to distribute such heat throughout the primary side of the unitized steam generating unit 15. As the primary water warms up, it will expand and the resulting increased amount is drained from the primary side to maintain the pressure below 500 p.s.i. until the temperature of the primary water is above 200° F. Drainage of primary water is accomplished through the pressurizer 114 and through a suitable valved conduit (not shown) and will serve to warm the pressurizer 114 while the primary water is coming up to temperature.

This warming procedure will continue until the temperature exceeds 212° F. (or less at high altitudes in the secondary side of the steam generator 17 which is at atmospheric pressure at this time) at which time the secondary side is drained to a normal water level 148. As the warm-up procedure continues, a steam pressure of 50 p.s.i. is attained on the secondary side of the plant at which time the turbine warm-up is started. The steam pressure will increase rapidly, and in the range of 50–100 p.s.i., it will be possible to bring the turbine generator 194 up to normal operating speed, excite the generator and use the output of the turbine generator 194 for supplying the small amount of power required by the plant auxiliaries, recharge batteries used as auxiliary power supplies, and supply some power to the main load.

Having thus reached the point of obtaining power from the turbine generator 194, the electric heaters in the pressurizer 114 will be energized. The electric heaters raise the temperature of the water in the pressurizer 114 to approximately 400 degrees F., at which time a low water level in the pressurizer 114 will be established by draining a portion of the primary water from the pressurizer 114. From this point on, warm-up can proceed at a rate limited only by the thermal stresses which the pressure vessels in the plant system can withstand. This limitation is expected to be approximately 150 degrees F. per hour, and thus the entire plant to be brought from a cold condition to full operating temperature and pressure conditions in approximately 6 hours.

Referring now to FIGS. 7 and 8, there are shown alternate arrangements for the vertical steam generator 17 in order to provide a vent for the primary side of the steam generator for such applications, for example, wherein it is deemed necessary or desirable to provide for removal of uncondensed gases from the primary circuit in this fashion. Referring now specifically to FIG. 7, a steam generator 212 is provided which is generally similar to the vertical steam generator 17 except as noted hereinafter. In this arrangement, the water level 148 is maintained at the same relative position as previously described in reference to FIG. 2A. In the upper wall portion of a tubularly shaped casing 216 and below the operating water level 148, a vertically positioned discoidal upper tube sheet 214 is secured to the casing 216 by any suitable means such as welding. A spheroidal projection or protuberance 218 is secured to the outer face of the upper tube sheet 214.

A primary system vent 220 is then provided in the uppermost portion of the projection 218. A valve (not shown), which can be manually controlled or remotely controlled by any suitable means well known in the art, is secured to the primary vent 220.

A plurality of inverted, L-shaped riser tubes 222 and downcomer tubes 224 are disposed within the steam generating chamber 122 and have their lower end portions secured to the tube sheet 106 and their upper end portions secured to the tube sheet 214. The riser tubes 222 communicate with the space enclosed by the header 116; whereas, the downcomer tubes 224 communicate with the space enclosed by the reducer 108 but exterior to the header 116. For space considerations, in this arrangement, the feedwater conduit 146 has been relocated from the upper portion of the steam generating chamber 122 as shown previously in FIG. 2 to the lower portion of the steam generating chamber 122 as shown in FIG. 7. Except for the relocation, the feedwater conduit 146 is constructed in the same manner as previously described with reference to FIG. 2.

A modified wrapper 217 and a modified wrapper extension 219 are the same as previously described with reference to FIG. 2, except as noted hereinafter. The wrapper 217 and extension 219 have a circular opening 223 formed on one side to permit the passage of the riser and downcomer tubes 222 and 224 respectively. The casing of the modified wrapper 217 and the wrapper extension 219 butt against the upper tube sheet 214 as tightly as possible to minimize the leakage through the wrapper opening 223.

The modified wrapper extension 219 rests on the wrapper 217 at a joint 221 therebetween. To minimize leakage through the joint 221 a lap joint with a press fit can be used and still permit the wrapper extension 219 to be disassembled from the wrapper 217 with comparative ease. If necessary, suitably shaped brackets (not shown) can be used to hold down the modified wrapper extension 219 to the wrapper 217 by securing the brackets to the casing 216 and to the extension 219.

The spacers 132, the upper brackets 140, the lower brackets 142, the tie rods and the tie rod collars, all of which were previousy described in FIG. 2A, are the same in the arrangement shown in FIG. 7. Also, all separatory and other components disposed within and above the modified wrapper extension 128 and within the upper portion of the steam generating chamber 122, as described in FIG. 2A, are included in this arrangement shown in FIG. 7. The thermal circulation reactor 16, on which the first alternate steam generator 212 rests, can be the same as previously described in connection with FIG. 2B.

In operation, the heated primary water flows from the reactor core 42 as previously described with reference to FIG. 2B and flows through the upper circulating conduit 100 into the header 116. From the header 116 the primary water flows upwardly through the riser tubes 222, reverses its direction within the projection 218, and flows downwardly through the downcomer tubes 224. After the primary water leaves the downcomer tubes 224, the primary water flows downwardly to the bottom of the reactor core 42 (FIG. 2B) following the flow path previously described with reference to FIG. 2.

If any gases are formed within the primary system, the gases will accumulate in the upper portion of the projection 218. Any such accumulated gases can then be vented through the primary vent 220 to any suitable disposal means well known in the art.

The secondary water, disposed on the outside of the riser tubes 222 and the downcomer tubes 224, absorbs heat from the primary water flowing through the riser tubes 222 and the downcomer tubes 224. A portion of the secondary water then vaporizes into steam. The steam water mixture then follows the flow path previously described with reference to FIGS. 1 and 2.

Referring now specifically to FIG. 8, another alternative steam generator arrangement 226 is shown for the vertical steam generator 17 (FIG. 2A). The arrangement shown in FIG. 8 is constructed in the same manner as previously described with reference to FIG. 7 except as noted hereinafter, and accordingly identical reference characters are used to denote identical parts, as in the case of FIGS. 2A and 7. In this arrangement, the header 116 and the upper portion of the upper circulating conduit 100 are eliminated and are replaced with a single riser pipe 228 which couples the upper circulating conduit 100' with the protuberance 218. The riser piper 228 rises vertically from the upper circulating conduit 100', passes through an opening centrally located in a lower tube sheet 106', is sealingly secured to the tube sheet 106', continues to rise vertically through the steam generating chamber 122, makes a substaniallly 90 degrees bend, and passes through an opening centrally formed within an upper tube sheet 214' and is sealingly secured to the upper tube sheet 214'. The thermal circulation reactor 16, which supports the steam generator 226, desirably is constructed in the same manner as previously described with reference to FIG. 2B.

In operation, the heated primary water from the reactor core 42 (FIG. 2B) flows through the upper circulating conduit 100', through the riser pipe 228, reverses its direction of flow in the dome 218, and flows downwardly through the downcomer tubes 224. The primary water then returns to the bottom of the reactor core 42 (FIG. 2B) in the same manner as previously described with reference to FIG. 7. The operation of the secondary side of the steam generator 226 is the same as previously described with reference to FIG. 7.

Referring now specifically to FIG. 9, another alternative steam generator 230 is shown therein and is arranged in accordance with the present invention. A casing 232 forms the major portion of the shell for the steam generator 230. The reducer 108 and other components below the casing 232 and forming the lower portion of the steam generator 230 are the same as previously described for FIG. 2A. These and other previously described components are identified by identical reference characters when shown. In one side wall portion of the casing 232 and adjacent its lower end is secured a vertically positioned, discoidal, lower tube sheet 234. To the outer face of the lower tube sheet 234 is secured a spheroidal projection or protuberance 236. Approximately halfway between the top of the steam generator 230 and the lower tube sheet 234 a horizontally positioned, discoidal, upper tube sheet 238 is secured to the casing 232. The spaces enclosed above and below the upper tube sheet 238 are a steam separating chamber 240 and a steam generating chamber 242, respectively. A primary system vent 243 in this arrangement is located at the top of the steam generating chamber 242, which, in this arrangement, is the highest point in the primary circuit.

A vertical baffle 244 extends upwardly to a point near the upper tube sheet 238 and is secured to the annular casing 232 and to the top of the vertically positioned side wall forming a part of the header structure 116. A plurality of L-shaped riser tubes 246 are disposed within the steam generating chamber 242 and have their end portions respectively secured to the lower tube sheet 234 and to the upper tube sheet 238. An external secondary downcomer pipe 248 couples the water-filled, lower portion of the steam separating chamber 240 to the upper portion of the protuberance 236. The feedwater inlet 250 penetrates the bend of the downcomer pipe 248 to provide uniform dispersion of the feedwater. An operating water level 148 is maintained within the steam separating chamber 240 at a point adjacent the wrapper extension 241, as previously described with reference to FIG. 2A. The steam generator 230 is supported for example, by the thermal circulation reactor 16 (FIG. 2B) as previously described with reference to FIG. 2B.

The steam separating and related components disposed within the steam separating chamber 240 are the same components disposed within the steam generating chamber 122 (FIG. 2A) and previously described with reference to FIG. 2A except that the U tubes 126, the spacers 132, and the feedwater conduit 146 (all previously shown in FIG. 2A) have been eliminated and the wrapper 245 extends downwardly to a point above the inlet to the downcomer pipe 248.

In operation, the heated primary water from the reactor core 42 (FIG. 2B) flows upwardly through the upper circulating conduit 100 (FIG. 9), continues its upward flow on one side of the vertical baffle 244, reverses its direction of flow adjacent the upper end of the steam generating chamber 242, and flows downwardly on the other side of the vertical baffle 244. The primary water continues its flow downwardly on the outside of the upper circulating conduit 100 and continues its flow downwardly to the bottom of the reactor core 42 (FIG. 2B) via a flow path previously described with reference to FIG. 2B.

Feedwater from external sources, as previously described with reference to FIG. 1, enters the downcomer pipe 248 through the feedwater inlet 250; and secondary water from the bottom of the steam separating chamber 240 enters the downcomer pipe 248 and flows downwardly to the protuberance 236. The secondary water then flows upwardly through the riser tubes 246, where the flowing secondary water absorbs heat from the primary water passing over the outer surfaces of the riser tubes 246. Part of the secondary water flowing through the riser tubes 246 vaporizes into steam. From the riser tubes 246 the steam-water mixture enters the bottom of the steam separating chamber 240. The steam-water mixture then flows upwardly through the steam separating chamber 240 and passes through the vapor separating means disposed within the steam separating chamber 240 as previously described with reference to FIG. 2A.

After the water has been removed from the steam, the steam leaves the top of the steam separating chamber 240 through the steam outlet 162 and follows a flow path previously described with reference to FIG. 1.

In all of the steam generator arrangements hereinbefore described, the heated primary fluid leaving the thermal circulation reactor 16 (FIG. 2B) and entering the steam generators can be heated primary water, a mixture of steam and water, or substantially all steam.

Figure 10:
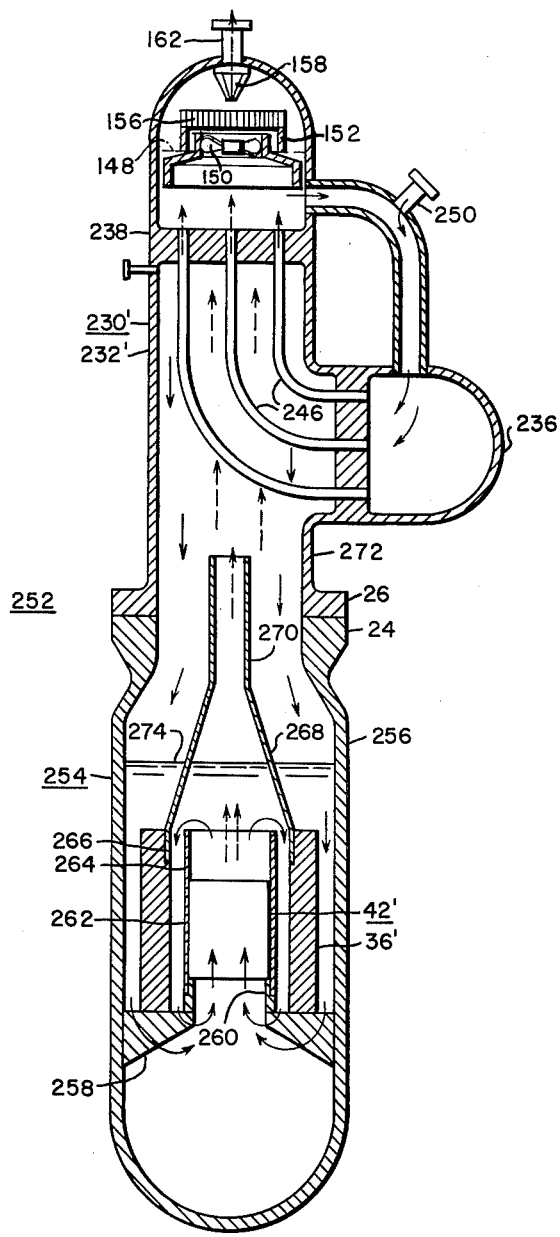
FIGURE 10 is a longitudinally sectional view of another form of the vapor generating system and shows an arrangement for a self-pressurized, condensing heat exchange means on the outside of the tubes with boiling resulting on the inside of the tubes.

Referring now specifically to FIG. 10, an alternative arrangement for a unitized steam generator 252 as arranged for indirect cycle boiling water operation is shown. The unitized steam generator 252 comprises also an alternative arrangement for a thermal circulation reactor 254 in accordance with the invention, and a modified steam generator 230'. A reactor vessel 256 is the same as the reactor vessel 18 (FIG. 2B) previously described with reference to FIG. 2B, except that the diameter of the reactor vessel flange 24 has been reduced in order to be properly aligned with the steam generator flange 26. This results because the diameter of the steam generator 230' can be reduced as the steam produced on the primary side condenses on the riser tubes 246 and a greater amount of heat exchange can be effected with the water flowing within the riser tubes 246 than with the use of heated primary water.

At the lower end of the interior side wall of the reactor vessel 256 is provided an inwardly extending annular core support flange 258, which is secured to the vessel 256 by any suitable means such as by welding. A conventional thermal shielding arrangement denoted generally by the reference character 36' is disposed within the reactor vessel 256 and supported by the core support flange 258 as previously described with reference to FIG. 2B. The core support flange 258 also supports an annular, offset ring 260, which in turn supports the reactor core 42'. The core support flange 258 is provided at its outer periphery with axially extending openings (not shown) formed therein and coupling the space between the thermal shield 36' and the reactor vessel 256 with the lower portion of the reactor vessel 256. The core support flange 258 also is provided with axially extending openings (not shown) formed therein at the inner periphery of the core support flange 258 and coupling the space between the reactor core 42 and the thermal shield 36' with the lower portion of the reactor vessel 256.

To the outer offset portion of the offset ring 260 is secured a core baffle 262, which has a central opening therein formed of the same configuration as the outer perimeter of the reactor core 42' in order to receive the fuel assemblies, which are constructed to allow boiling water operation as is well known in the art. To the top of the core baffle 262 is secured, by any suitable means such as by welding, a core baffle extension 264, which extends upwardly from the top of the reactor core 42' to the top of the thermal shield 36'. A frustoconically shaped circulating conduit or stack 268 is disposed directly above the reactor core 42'. The end of the circulating conduit 268 having the larger diameter is formed into a relatively short cylindrical portion which is secured to an inner offset 266 formed at the top of the thermal shield 36'. At the end of the circulating conduit 268 having the smaller diameter is secured a tubularly shaped extension 270, which extends upwardly into steam generator throat 272.

The steam generator 230' is constructed in the same manner as previously described for the modified steam generator 230 referenced in FIG. 9 with the execptions noted hereinafter. The vertical baffle 244, the header 116, the upper circulating conduit 100, and the reducer 108, all shown in FIG. 9, have been eliminated with reference to the steam generator 230'. An annular casing 232' extends downwardly to the steam generator flange 26 without the reduction in diameter previously shown in FIG. 9.

In operation, the primary water flows upwardly through the reactor core 42', absorbs heat as its passes through the reactor core 42', and exits from the core 42' as a steam-water mixture. The steam together with a minor amount of entrained water separates from the mixture at the free surface of a water level 274 maintained above the core baffle extension 264. The heated primary water that does not vaporize "spills" over the top of the core baffle extension 264 and flows downwardly in the space defined between the thermal shield 36' and the core baffle 262. The primary water then continues its downward flow through the aforesaid openings in the core support flange 258 into the lower portion of the reactor vessel 256, reverses its direction and again flows upwardly through the reactor core 42'.

The steam formed within the reactor core 42' flows upwardly through the frustoconical stack 268, through the stack extension 270, and over the surfaces of the riser tubes 246. As the steam passes over the surfaces of the riser tubes 246, the steam gives up its heat to the secondary water flowing inside the riser tubes 246. Upon giving up its heat, the steam condenses into water and drops into the space defined between the reactor vessel 256 and the circulating conduit or stack 268. The water then continues to flow downwardly through the annular flow space between the thermal shield 36' and the reactor vessel 256 and passes through the aforesaid axial openings at the outer periphery of the core support flange 258. The water then enters the lower portion of the reactor vessel 256, reverses its direction, and again flows upwardly through the reactor core 42', thus completing the cycle in the primary side of the unitized steam generator 252.

The pressurizer 114 (FIG. 1) is eliminated in this self-pressurized arrangement as the water level 274 is maintained sufficiently low to permit the formation of a steam space above the water level 274 and to permit the volume occupied by the steam to equal at least the volume of the steam space normally maintained within the pressurizer 114. Any of the other unitized steam generating systems described hereinbefore can also be self-pressurized and have the pressurizer 114 (FIG. 1) eliminated by constructing a suitable reactor core in which boiling can occur and by maintaining a similar steam space on the primary side of the system above the reactor core.

The flow cycle of the steam and water on the secondary side of the steam generator 230' is the same as previously described with reference to FIG. 9.

As an alternative arrangement of the equipment shown in FIG. 10, the frustoconically shaped circulating conduit 268 with its tubularly shaped extension 270 can be completely eliminated and replaced by a cone shaped baffle (not shown), centrally positioned inside the reactor vessel 256 above the free surface of the water 274. This cone shaped baffle serves to direct the returning condensate from the vapor generator 230' away from the coolant rising through the reactor core 42'. This cone shaped baffle will not impede the flow of steam to the steam generator 230'. Such an arrangement will assist in the recirculation of water through the reactor core 42'.

From the foregoing, it is apparent that novel and sufficient vapor generating arrangements have been disclosed therein. Although the invention has been described with particularity, it is understood that the present disclosure has been made by way of illustrative examples of the invention and that numerous changes in the details of construction and the combination and arrangement of parts may be resorted to without departing from the spirit and the scope of the invention as hereinafter claimed. It is also contemplated that certain features of the invention can be employed without a corresponding use of other features thereof.

Accordingly what is claimed as inventive is:

1. In a unitized vapor generating apparatus capable of containing a primary fluid, the combination comprising a lower tubular casing, an upper tubular casing supported by said lower tubular casing in communication therewith, detachable means for coupling said upper casing to said lower casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, interfitting connecting conduit means for coupling said heat source to said heat exchange means so as to provide separate flow paths for the heated and cooled primary fluid flows between said heat source and said heat exchange means, means for circulating a secondary liquid through said heat exchange means, said secondary liquid being maintained in heat exchange relation with but separated from said primary fluid by said heat exchange means and formed into a vapor by the absorption of heat from said heat exchange means, a vapor separating means disposed above said heat exchange means and within said upper tubular casing to separate entrained liquid within said vapor, a vapor outlet communicating with the top of said heat exchange means to permit the flow of said vapor to external vapor utilizing means, said conduit means being disposed for engagement and disengagement simultaneously with the coupling and decoupling respectively of said upper casing with said enclosed vapor separating means and heat exchange means relative to said lower casing.

2. In a unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, structure defining inlet and outlet chambers adjacent the lower portion of said upper casing for the primary side of said heat exchange means for the entry and exit of heated and cooled primary fluid therefrom respectively, interfitting connecting conduit means for coupling said heat source to the inlet and outlet chambers of said heat exchange means so as to provide separate flow paths for the heated and cooled primary fluid flows between said heat source and said inlet and outlet chambers, a plurality of heat exchange tubes disposed within said upper casing having one end portion in communication with said inlet chamber and the other end portion in communication with said outlet chamber for said primary fluid, said upper casing being capable of containing a secondary liquid separated from said primary fluid by said heat exchange tubes and formed into a vapor by the absorption of heat from said primary fluid flowing through said heat exchange tubes, and vapor separating means disposed above said heat exchange means and within said upper tubular casing to separate entrained liquid within said vapor.

3. In a unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, structure defining inlet and outlet chambers adjacent the lower portion of said upper casing for the primary side of said heat exchange means for the entry and exit of heated and cooled primary fluid therefrom respectively, connecting conduit means for coupling said heat source to the inlet and outlet chambers of said heat exchange means so as to provide separate flow paths for the heated and cooled primary fluid flows between said heat source and said inlet and outlet chambers, casing means defining an intermediate chamber adjacent and exterior to the upper portion of said upper casing, a plurality of riser and downcomer tubes disposed within said upper casing having first end portions thereof in communication with said inlet and said outlet chambers respectively and their second end portions in communication with said intermediate chamber, said upper casing being capable of containing a secondary liquid separated from said primary fluid by said heat exchange tubes and formed into a vapor by absorption of heat from said primary fluid flowing through said heat exchange tubes, and vapor separating means disposed above said heat exchange means and within said upper tubular casing to separate entrained liquid within said vapor.

4. A unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, structure defining inlet and outlet chambers adjacent the lower portion of said upper casing for the primary side of said heat exchange means for the entry and exit of heated and cooled primary fluid therefrom respectively, connecting conduit means for coupling said heat source to the inlet and outlet chambers of said heat exchange means so as to provide separate flow paths for the heated and cooled primary fluid flows between said heat source and said inlet and outlet chambers, casing means defining an intermediate chamber adjacent and exterior to the upper portion of said upper casing, at least one centrally positioned heat exchange riser pipe disposed within said upper casing and having one end in communication with said inlet chamber and the other end in communication with said intermediate chamber, a plurality of downcomer heat exchange tubes having first end portions thereof in communication with said outlet chamber and their second end portions in communication with said intermediate chamber, said upper casing being capable of containing a secondary liquid separated from said primary fluid by said heat exchange tubes and formed into a vapor by the absorption of heat from said primary fluid flowing through said heat exchange tubes, and vapor separating means disposed above said heat exchange means and within said upper tubular casing to separate entrained liquid within said vapor.

5. In a unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, connecting conduit means for coupling said heat source to said heat exchange means so as to provide separate flow paths for the heated and cooled primary fluid flows between said heat source and said heat exchange means, a vapor generating chamber within the lower portion of said upper casing, venting means at the top of said vapor generating chamber to vent any gas accumulating at the top of said vapor generating chamber, a vapor separating chamber within the upper portion of said upper casing, casing means defining an intermediate chamber adjacent to and exterior to the lower portion of said upper casing, a plurality of riser tubes disposed within said vapor generating chamber having first end portions thereof in communication with said intermediate chamber and their second other end portions in communication with said vapor separating chamber, a downcomer conduit coupling the lower portion of said vapor separating chamber to said intermediate chamber, baffle means within said vapor generating chamber to define a two pass flow path for the primary fluid passing over the outer surfaces of said riser tubes, means for supplying a secondary liquid to said vapor separating chamber, said secondary liquid being capable of being thermally circulated through said riser tubes, through said downcomer conduit and through said intermediate chamber and of being formed into a vapor from the heat said secondary liquid absorbs from said primary fluid flowing over said riser tubes, at least one vapor separating means disposed within the upper portion of said vapor separating chamber to separate entrained liquid within said vapor, and means for conveying said vapor from said vapor separating chamber to external vapor utilizing means.

6. In a untized vapor generating apparatus capable of containing a primry fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being capable of imparting sufficient heat to said primary fluid to cause a thermal circulation of said primary fluid between said heat source and said heat exchange means, a vapor generating chamber within the lower portion of said upper casing, venting means at the top of said vapor generating chamber to vent any gas accumulating at the top of said vapor generating chamber, a vapor separating chamber within the upper portion of said upper casing, casing means forming an intermediate chamber adjacent to and exterior to the lower portion of said upper casing, a plurality of riser tubes disposed within said vapor generating chamber and having first end portions in communication with said intermediate chamber and their second end portions in communication with said vapor separating chamber, at least one downcomer conduit coupling the lower portion of said vapor separating chamber to said intermediate chamber, a circulating baffle secured adjacent the coolant outlet of said heat source and formed so as to direct the flow of said primary fluid upwardly into the central region of said vapor generating chamber, means for supplying a secondary liquid to said vapor separating chamber said secondary liquid thermally circulating through said riser tubes, said downcomer conduit and said intermediate chamber and formed into a vapor from the heat said secondary liquid absorbs from said primary fluid flowing over said riser tubes, at least one vapor separating means disposed within the upper portion of said vapor separating chamber to separate entrained liquid within said vapor, and means for conveying said vapor from said vapor separating chamber to external vapor utilizing means.

7. In a unitized fluid heating apparatus capable of containing a primary fluid, the combination comprising a lower tubular casing, an upper tubular casing supported by said lower tubular casing in communication therewith, a heat source disposed within said lower casing, a heat exchange means connected to and disposed within said upper casing whereby said primary fluid is heated by said heat source and cooled by said heat exchange means, said heat source being formed to impart sufficient heat to said primary fluid to cause a thermal circulation of said primary fluid between said heat source and said heat exchange means, interfitting connecting conduit means for coupling said heat source to said heat exchange means so as to provide separate flow paths for the heated and cooled primary fluid flows between said heat source and said heat exchange means, said interfitting connecting conduit means comprising a lower connecting conduit extending upwardly from said heat source and an upper connecting conduit extending downwardly from said heat exchange means so that the bottom portion of said upper connecting conduit slidably interfits with the upper portion of said lower connecting conduit, detachable means for coupling said upper casing and said heat exchange means therein to said lower casing, said upper connecting conduit and said lower connecting conduit being disposed for engagement and disengagement simultaneously with the coupling and decoupling respectively of said upper casing with said heat exchange means relative to said lower casing, means for circulating a secondary fluid through said heat exchange means, said secondary fluid being maintained in heat exchange relation with but separated from said primary fluid by said heat exchange means and heated by the absorption of heat from said heat exchange means, and a secondary fluid outlet communicating with the top of said heat exchange means to permit the flow of said heated secondary fluid to external means capable of utilizing said heated secondary fluid.

8. In a unitized fluid heating apparatus capable of containing a primary fluid, the combination comprising a lower tubular casing, an upper tubular casing supported by said lower tubular casing in communication therewith, detachable means for coupling said upper casing to said lower casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, said heat exchange means having its lower portion connected to said upper casing, structure defining inlet and outlet chambers adjacent the lower portion of said upper casing for the primary side of said heat exchange means for the entry and exit of heated and cooled primary fluid therefrom respectively, interfitting connecting conduit means for coupling said heat source to the inlet and outlet chambers of said heat exchange means so as to provide separate flow paths for the heated and cooled primary fluid flows between said heat source and said inlet and outlet chambers, said interfitting connecting conduit means comprising a lower connecting conduit extending upwardly from said heat source and an upper connecting conduit extending downwardly from said inlet and outlet chambers so that the bottom portion of said upper connecting conduit slidably interfits with the upper portion of said lower connecting conduit, said upper connecting conduit and said lower connecting conduit being disposed for engagement and disengagement simultaneously with the coupling and decoupling respectively of said upper casing with said heat exchange means relative to said lower casing, a plurality of heat exchange tubes disposed within said upper casing having one end portion in communication with said inlet chamber and the other end portion in communication with said outlet chamber for said primary fluid, said upper casing being capable of containing a secondary fluid separated from said primary fluid by said heat exchange tubes and heated by the absorption of heat from said primary fluid flowing through said heat exchange tubes, and a secondary fluid outlet communicating with the top of said heat exchange means to permit the flow of said heated secondary fluid to external means capable of utilizing said heated secondary fluid.

9. A unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, structure defining inlet and outlet chambers adjacent the lower portion of said upper casing for the primary side of said heat exchange means for the entry and exit of heated and cooled primary fluid therefrom respectively, connecting conduit means for coupling said heat source to the inlet and outlet chambers of said heat exchange means so as to provide separate flow paths for the heated and cooled primary fluid flows between said heat source and said inlet and outlet chambers, casing means defining an intermediate chamber adjacent and exterior to the upper portion of said upper casing, at least one heat exchange riser pipe disposed within said upper casing and having one end in communication with said inlet chamber and the other end in communication with said intermediate chamber, at least one downcomer heat exchange tube having one end in communication with said outlet chamber and the other end in communication with said intermediate chamber, said upper casing being capable of containing a secondary liquid separated from said primary fluid by said heat exchange tubes and formed into a vapor by the absorption of heat from said primary fluid flowing through said heat exchange tubes, and a vapor outlet communicating with the top of said heat exchange means to permit the flow of said vapor to external vapor utilizing means.

10. In a unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being formed to impart sufficient heat to said primary fluid to cause a thermal circulation of said primary fluid between said heat source and said heat exchange means, connecting conduit means for coupling said heat source to said heat exchange means so as to provide separate flow paths for the heated and cooled primary fluid flows between said heat source and said heat exchange means, a vapor generating chamber within the lower portion of said upper casing, a vapor separating chamber within the upper portion of said upper casing, casing means defining an intermediate chamber adjcaent to and exterior to the lower portion of said upper casing, at least one riser tube disposed within said vapor generating chamber having one end in communication with said intermediate chamber and the other end in communication with said vapor separating chamber, a downcomer conduit coupling the lower portion of said vapor separating chamber to said intermediate chamber, baffle means within said vapor generating chamber to define a two pass flow path for the primary fluid passing over the outer surface of said riser tube, means for supplying a secondary liquid to said vapor separating chamber, said secondary liquid capable of being thermally circulated through said riser tube, through said downcomer conduit and through said intermediate chamber and of being formed into a vapor from the heat said secondary liquid absorbs from said primary fluid flowing over said riser tube, and means for conveying said vapor from said vapor separating chamber to external vapor utilizing means.

11. In a unitized vapor generating apparatus capable of containing a primary fluid, the combination comprising a lower tubular casing, an upper tubular casing supported by and coupled to said lower tubular casing, a heat source and a heat exchange means disposed within said lower and said upper casings respectively whereby said primary fluid is heated by said heat source and cooled by said heat exchange means, said heat source being capable of imparting sufficient heat to said primary fluid to cause a thermal circulation of said primary fluid between said heat source and said heat exchange means, a vapor generating chamber within the lower portion of said upper casing, a vapor separating chamber within the upper portion of said upper casing, casing means forming an intermediate chamber adjacent to and exterior to the lower portion of said upper casing, at least one riser tube disposed within said vapor generating chamber having one end in communication with said intermediate chamber and the other end in communication with said vapor separating chamber, at least one downcomer conduit coupling the lower portion of said vapor separating chamber to said intermediate chamber, a circulating baffle secured adjacent the coolant outlet of said heat source and formed so as to direct the flow of said primary fluid upwardly into the central region of said vapor generating chamber, means for supplying a secondary liquid to said vapor separating chamber, said secondary liquid thermally circulating through said riser tube, said downcomer conduit and said intermediate chamber and vaporizing from the heat said secondary water absorbs from said primary fluid flowing over said riser tube, and means for conveying said vapor from said vapor separating chamber to external vapor utilizing means.

References Cited by the Examiner

UNITED STATES PATENTS

| | | | |
|---|---|---|---|
| 1,687,172 | 10/28 | Mertzanoff | 122—218 |
| 2,141,123 | 12/38 | Brabbee et al. | 122—218 |
| 2,862,479 | 12/58 | Blazer et al. | |
| 2,961,363 | 11/60 | Monson | 204—193.32 |
| 2,985,575 | 5/61 | Dennis et al. | 204—193.2 |
| 3,057,333 | 10/62 | Kuhner | 122—491 |

FOREIGN PATENTS

| | | |
|---|---|---|
| 220,867 | 1/59 | Australia. |
| 566,748 | 10/58 | Belgium. |

(Corresponding to Great Britain 841,656, 7/20/60)

| | | |
|---|---|---|
| 803,382 | 10/58 | Great Britain. |
| 828,468 | 2/60 | Great Britain. |
| 555,400 | 7/55 | Italy. |

OTHER REFERENCES

German printed application 1,039,147, printed September 18, 1958.

FREDERICK L. MATTESON, JR., *Primary Examiner.*

REUBEN EPSTEIN, PERCY L. PATRICK, ROBERT A. O'LEARY, *Examiners.*